No. 892,554. PATENTED JULY 7, 1908.
F. W. ROLLER.
SHUNT.
APPLICATION FILED JUNE 9, 1905.
*Fig. 1*
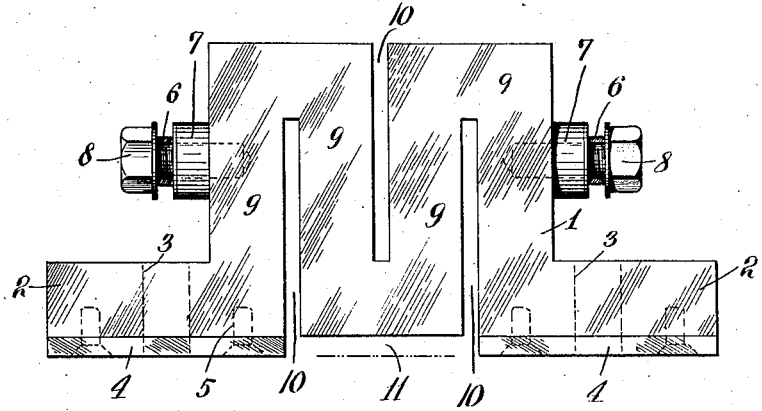
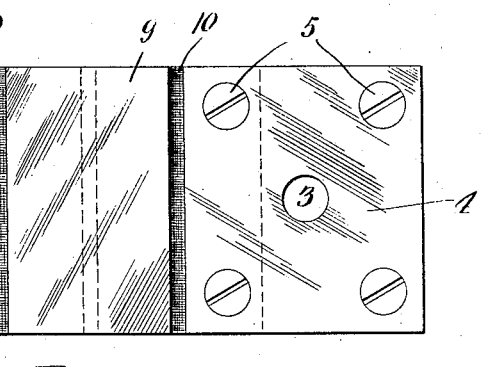
*Fig. 2*
Witnesses
S. K. Sager.
Geo. N. Kerr.
Frank W. Roller, Inventor
By his Attorney
C. N. Edwards

UNITED STATES PATENT OFFICE.

FRANK W. ROLLER, OF PLAINFIELD, NEW JERSEY, ASSIGNOR TO WHITNEY ELECTRICAL INSTRUMENT COMPANY, A CORPORATION OF NEW YORK.

SHUNT.

No. 892,554.      Specification of Letters Patent.      Patented July 7, 1908.

Application filed June 9, 1905. Serial No. 264,408.

*To all whom it may concern:*

Be it known that I, FRANK W. ROLLER, a citizen of the United States, residing at Plainfield, in the county of Union and State of New Jersey, have invented certain new and useful Improvements in Shunts, of which the following is a full, clear, and exact specification.

In the measurement of electrical currents of relatively large magnitude, it is common practice to employ shunts in connection with the measuring instrument itself, the said shunts being by-paths through which the major portion of the current flows. If the ratio of the resistance of the path through the shunt to that of the path through the instrument remains substantially constant, the same fraction of the total current will obviously always flow through the instrument and the latter may hence be calibrated so as to indicate the value of that total current. In overcoming the resistance offered to the flow of the current through the shunt, energy is necessarily consumed and this energy, which takes the form of heat, must in turn be dissipated by the shunt as otherwise the temperature of the latter would naturally go on increasing until the resistance of the shunt became altered beyond permissible limits and until rupture resulted. The problem of successfully disposing of this heat has always been a difficult one. A solution in common use has been to form the shunts of thin strips of resistance alloy attached at their ends to heavy terminal blocks, the strips being relatively so short that the heat generated therein is conveyed over this short length by conduction to the terminals and from the terminals to the conductors or bus-bars thereto attached. This construction has the advantage of making the total shunt length small so that ample space for it is easily found but it also has several disadvantages. The numerous short plates of resistance metal can, in a commercial structure, be secured to terminals at their two ends efficiently only by soldering and it is difficult to insure that such a number of soldered joints simultaneously made shall all be sound mechanically and electrically. Being built up of two different metals, viz., the resistance blades and the terminals, thermo electromotive forces are set up which, while they cancel one another if both ends of the shunt are at the same temperature, do not cancel if these temperatures differ and the resultant electromotive force due to this of itself causes a current to flow through the indicating instrument which, because of the sensibility of the latter, may readily introduce errors far beyond commercially permissible limits. Still further, if the bus-bars or conductors to which the shunt terminals are secured are of low thermal capacity and unable to dissipate the heat conveyed to them from the shunt blades, the temperature of said conductors constantly rises and that of the shunt must rise still higher in order to maintain the temperature difference requisite for the transference of heat at the requisite rate. As a result, it is frequently found that such shunts run at temperatures that are higher than is advisable.

By my invention, I am enabled to construct shunts which are free from the objections above cited and have certain advantages.

My improved shunt comprises a single continuous conductor, convoluted and of substantially uniform cross section, having a sufficient radiating surface to dispose of the heat generated therein by radiation and convection without its being necessary to place dependence on conduction through the body of the shunt to the conductors to which it is attached. By placing the points of attachment of the instrument terminals within the length of the solid conductor forming the shunt, I avoid the possibility of generation of the disturbing thermo electromotive forces.

While, as will be evident from the description which follows, I provide terminal plates of a good conducting metal, these are of relatively small mass and are merely for the purpose of insuring a proper distribution of the current through the mass of the shunt material, it being more feasible commercially to make a good joint between the metal of the terminal plates and the shunt at the time of manufacture than between the metal of the shunt and the bus-bars or conductors at the time of erection. The contact between the terminal plates and the bus-bars or conductors to which the shunt is secured may be effected by simply bolting them together in the conventional way.

My improved form of shunt comprises generally a convoluted conductor of substantially uniform cross section sufficient to carry the maximum current, the convolutions being disposed relatively to each other so as to provide spaces in which convection currents of air will be formed and surfaces from which heat may be radiated.

The invention is shown in the accompanying drawings, in which

Figure 1 is a plan view of my improved shunt, and Fig. 2 is a view of the base portion.

1 represents a resistance conductor which may be composed of any of the metals commonly used for that purpose, such as copper, iron, German silver, manganin, etc.

2, 2, represent the terminals of the shunt having the holes 3, through which bolts pass for securing the shunt to the bus-bars or other conductor whose current is to be measured.

4, 4, are plates of brass or copper secured to the terminals 2 by screws 5, and also amalgamated and soldered thereto, so as to provide good contact.

6, 6, are the terminals for the instrument leads, 7 being a washer of insulating material and 8 a screw tapped into the body 1.

The shunt proper comprises a plurality of convolutions 9, 9, 9, separated from each other by spaces 10, the convolutions being preferably rectangular in cross section and parallel, as shown, the spaces 10 being also parallel and lying in vertical planes, as shown. A space 11 is also provided between the inner convolutions and the plane of the face of the terminals.

In practice, the shunt will be disposed so that the faces of the terminals will engage the vertical sides of the bus-bars and the convolutions will then lie substantially in vertical planes, thus securing the best cooling effect from the circulation of the air due to the relation between the faces of the terminals and the spaces 10. It will be seen that this shunt, because of its relatively large width as compared with its thickness and owing to its convolute form, will have a large internal radiating surface in a short total length, and also that the heat generated is readily and quickly dissipated. By width I refer to the height shown in Fig. 2, and by thickness I refer to the thickness of parts 9 shown in Fig. 1. A further advantage of my improved shunt is that the distance between the terminals is reduced to a minimum, thus economizing space on the switch board. The weight required is also reduced to a minimum. As the heat is dissipated from the body of the shunt, I avoid the use of massive terminals for absorbing the heat energy and the width and thickness of the terminals of my improved shunt may be and are shown approximately the same as the body of the shunt.

The shunt may be constructed in various ways, as by casting or forging or by milling or cutting the alternate spaces or slots required, or by forming the convolutions from a flat conductor. The size, proportions, and number of convolutions will be varied according to the material and the use to which the shunt is to be applied, and also according to the drop in potential desired.

Having thus described my invention, I declare that what I claim as new and desire to secure by Letters Patent, is,—

1. A shunt for electrical measuring instruments comprising a pair of flat terminals connected by a convoluted conductor having its convolutions extending in planes substantially at right angles to the terminals, and means for connecting the instrument leads within the body portion of the shunt, substantially as described.

2. A shunt for electrical measuring instruments, comprising a block of metal having alternate slots extending inwardly from opposite sides so as to form convolutions of relatively large width as compared with the thickness for securing internal radiation and having terminals arranged so that the current will pass successively through each of said convolutions, and the said terminals having contact face plates permanently fixed thereto.

3. A shunt for electrical measuring instruments, comprising a convoluted conductor having the terminals and the convolutions of approximately the same width and thickness, and means for connecting the instrument leads within the body portion of the shunt.

4. A shunt for electrical measuring instruments, comprising a conductor having alternate slots extending inwardly from the opposite sides and having terminal contact faces parallel to at least one of said sides.

5. A shunt for electrical measuring instruments, comprising a conductor having alternate slots extending inwardly from the opposite sides, said conductor being of relatively large width as compared with its thickness and having terminal contact faces parallel to at least one of said sides.

6. A shunt for electrical measuring instruments, comprising a block of metal having alternate slots extending inwardly from the opposite sides so as to form convolutions of relatively large width as compared with their thickness and having terminal contact faces parallel to and approximately in the plane of one of said sides.

7. A shunt for electrical measuring instruments, comprising a conductor having alternate slots extending inwardly from the opposite sides, said conductor being of relatively large width as compared with its thickness and having terminal contact faces parallel to at least one of said sides, the convolutions of said shunt and terminals being of approximately the same width and thickness and the plane of the contact terminals being parallel to and approximately in the plane of one of said sides, and means for connecting the instrument leads within the body portion of the shunt, substantially as described.

In testimony whereof I affix my signature, in presence of two witnesses.

FRANK W. ROLLER.

Witnesses:
L. K. SAGER,
GEO. A. HOFFMAN.